Jan. 4, 1966 M. L. WEIGEL 3,227,193
COIL WINDING MACHINE
Original Filed March 26, 1959 10 Sheets-Sheet 1

INVENTOR.
MORTON L. WEIGEL
BY Mason, Kolehmainen,
Rathburn and Wyss
ATTORNEYS

Jan. 4, 1966   M. L. WEIGEL   3,227,193
COIL WINDING MACHINE
Original Filed March 26, 1959   10 Sheets-Sheet 3

Fig. 3
Fig. 11

INVENTOR.
MORTON L. WEIGEL
BY
Mason, Kolehmainen, Rathburn and Wyss
ATTORNEYS.

Jan. 4, 1966  M. L. WEIGEL  3,227,193
COIL WINDING MACHINE
Original Filed March 26, 1959  10 Sheets-Sheet 4

INVENTOR.
MORTON L. WEIGEL
BY
Mason, Kolehmainen, Rathburn and Wyss
ATTORNEYS.

Jan. 4, 1966  M. L. WEIGEL  3,227,193
COIL WINDING MACHINE
Original Filed March 26, 1959  10 Sheets-Sheet 5

INVENTOR.
MORTON L. WEIGEL
BY
Mason, Kolehmainen, Rathburn and Wyss
ATTORNEYS.

Jan. 4, 1966 M. L. WEIGEL 3,227,193
COIL WINDING MACHINE
Original Filed March 26, 1959 10 Sheets-Sheet 7

INVENTOR.
MORTON L. WEIGEL
BY
Mason, Kolehmainen, Rathburn and Wyss
ATTORNEYS.

United States Patent Office 3,227,193
Patented Jan. 4, 1966

3,227,193
COIL WINDING MACHINE
Morton L. Weigel, Bloomington, Ind., assignor to Sarkes Tarzian, Inc., Bloomington, Ind., a corporation of Indiana
Continuation of abandoned application Ser. No. 802,221, Mar. 26, 1959. This application June 30, 1965, Ser. No. 478,010
30 Claims. (Cl. 140—71)

The present invention relates to coil winding apparatus and more particularly to apparatus for automatically manufacturing multiple coil inductance units such, for example, as those employed in the VHF television tuner described in application Serial No. 708,594—Krepps et al., filed January 13, 1958, now abandoned, and the continuation of said abandoned application, Serial No. 120,-440, filed June 28, 1961. Specifically, this application is a continuation of my prior application Serial No. 802,221, filed March 26, 1959, now abandoned. All three of these applications are assigned to the same assignee as the present invention.

In the past, VHF television tuners have been primarily of either the switch type in which a plurality of incremental inductance units fixedly mounted in the tuner are selectively connected by a plurality of ganged switches into the various tuned circuits of the tuner, or of the turret type in which a plurality of inductance elements are mounted on a rotatable turret and are selectively moved into the various tuned circuits of the tuner. Each of these tuners have certain advantages and disadvantages relative to the other but prior to the present invention an important drawback of the turret type tuner has been the complexity of the individual inductance elements and the resultant high manufacturing cost thereof. As is pointed out in the heretoforementioned applications, Serial No. 708,594 and Serial No. 120,440, it is desirable to provide a tuner of the turret type which incorporates a single multiple inductance unit for each channel to be received, and it is further desirable to employ a multiple inductance unit which is adaptable to automatic assembly techniques. By providing a multiple inductance unit having this attribute, the manufacturing cost and the reliability of operation of the overall tuner can be so greatly improved as to provide a turret type tuner which is at least as reliable in operation and less expensive to manufacture than present-day switch type tuners having the same operating characteristics.

In order to derive the maximum advantage from using a multiple inductance unit of the type referred to above, it would be desirable to provide assembly apparatus which automatically winds a plurality of coils on a single insulating core, and which additionally performs the other functions required to completely and automatically manufacture a finished multiple inductance unit which is ready for mounting in the turret of a tuner. Furthermore, inasmuch as automatic assembly apparatus of this type is expensive, it is desirable that such machinery operate at very high speeds so as to reduce the number of such machines required to support a given assembly line operation, and in addition, it is important that such machinery be both precise and reliable in operation so as to insure the production of a maximum number of quality units.

Therefore, an object of the present invention is to provide a new and improved coil winding machine.

Another object of the present invention is to provide new and improved apparatus for winding a plurality of spaced apart coils of different inductance values on a single supporting core.

A further object of the present invention is to provide apparatus for automatically manufacturing multiple inductance units of the type disclosed in the above-identified applications, Serial No. 708,594 and Serial No. 120,440.

A still further object of the present invention is to provide automatic assembly apparatus for winding a plurality of different coils on a core and for soldering the terminal portions of the coils to terminal members included on the core.

Briefly, the above and further objects are realized in accordance with the present invention by providing automatic assembly apparatus to which coil forms having terminals previously mounted thereon are individually supplied and which thereafter winds a plurality of coils on the forms between the terminals, solders the terminal portions of the coils to the terminal members, and removes any undesired interconnecting portions of the wire.

The invention, both as to its organization and method of operation, together with further objects and advantages thereof, will best be understood by reference to the following detailed description taken in connection with the accompanying drawings, in which.

Figures 20, 21, 22, 23:
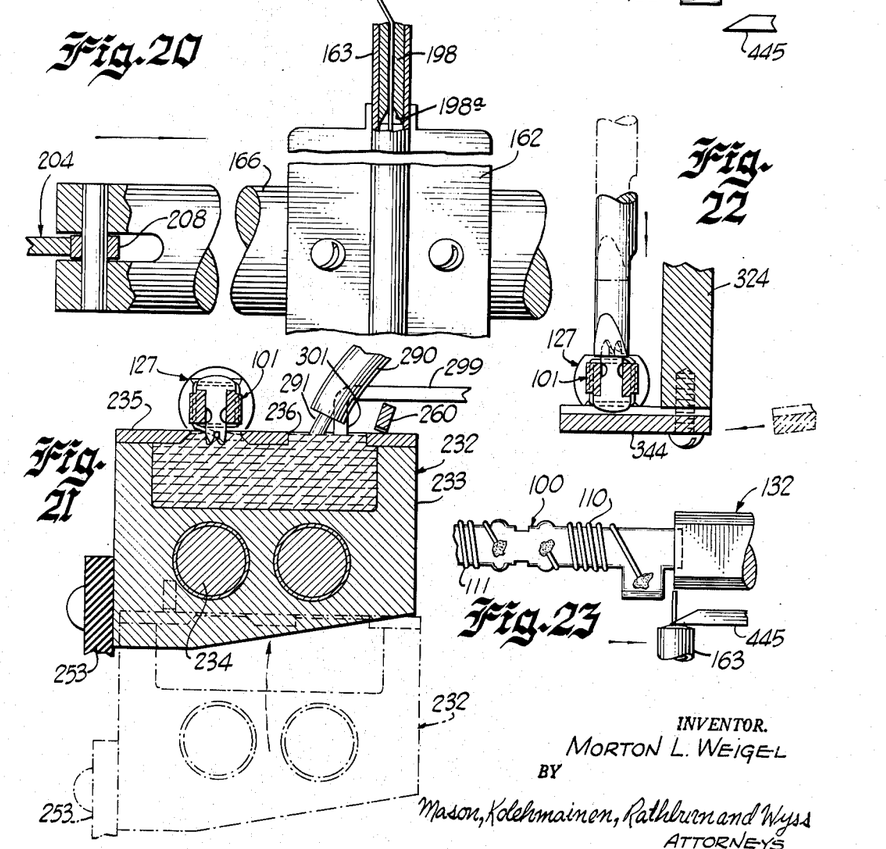
FIG. 20 is a partial view of the machine showing a coil form with a coil partially wound thereon during the winding operation.
FIG. 21 is a sectional view of the solder pot showing the manner it is moved into a soldering position during the operation of the machine.
FIG. 22 is a fragmentary view of a portion of the machine of FIG. 1 showing the manner in which the guillotine operates to sever certain portions of the wire from the coils wound on the coil form.
FIG. 23 is a fragmentary view illustrating the manner in which the wire from the wound unit is separated from the winding spool.
Figure 24:
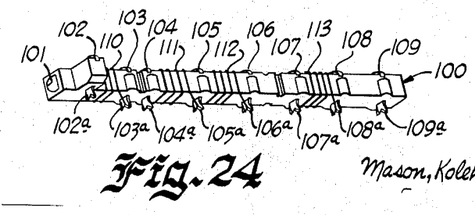
FIG. 24 is a perspective view of a multiple inductance unit as manufactured by the machine in the present invention.

Referring now to the drawings, and particularly to FIG. 24 thereof, there is shown a multiple inductance unit 100 of the type manufactured by a machine embodying the present invention. It comprises as its principal components an elongated coil form or stick 101 which is square in cross section and formed of a suitable insulating material such as, for example, a low dielectric loss ceramic. A plurality of terminal members 102, 103, 104, 105, 106, 107, 108, and 109 extend through the form and are provided with bifurcated solder lugs 102a, 103a, 104a, 105a, 106a, 107a, 108a and 109a at one end and rounded switching contacts at the other end. As shown, four inductance coils 110, 111, 112, and 113 are wound on the coil form 101 and connected to the solder lugs on the terminal members 102. As best illustrated in FIG. 21, the bottom edge of the notch formed by the bifurcations in each of the solder lugs 102a to 109a, inclusive, is spaced from the adjacent surface of the coil form 101 and the end portions of the inductance coils 110 to 113, inclusive, are positioned within these notches so that they are spaced from the coil form 101. As shown, the coils 110 and 113 are separated from the other coils, each of them thus necessitates two terminal members, but the coils 111 and 112 are connected together at the terminal member 105. In order to enable adjustment of a core (not shown) within the oscillator coil 110 thereby to adjust the frequency of the associated oscillator, one end of the coil form 101 is offset from the principal longitudinal axis thereof and the terminal 102 is mounted in the offset portion.

Figures 1, 8:
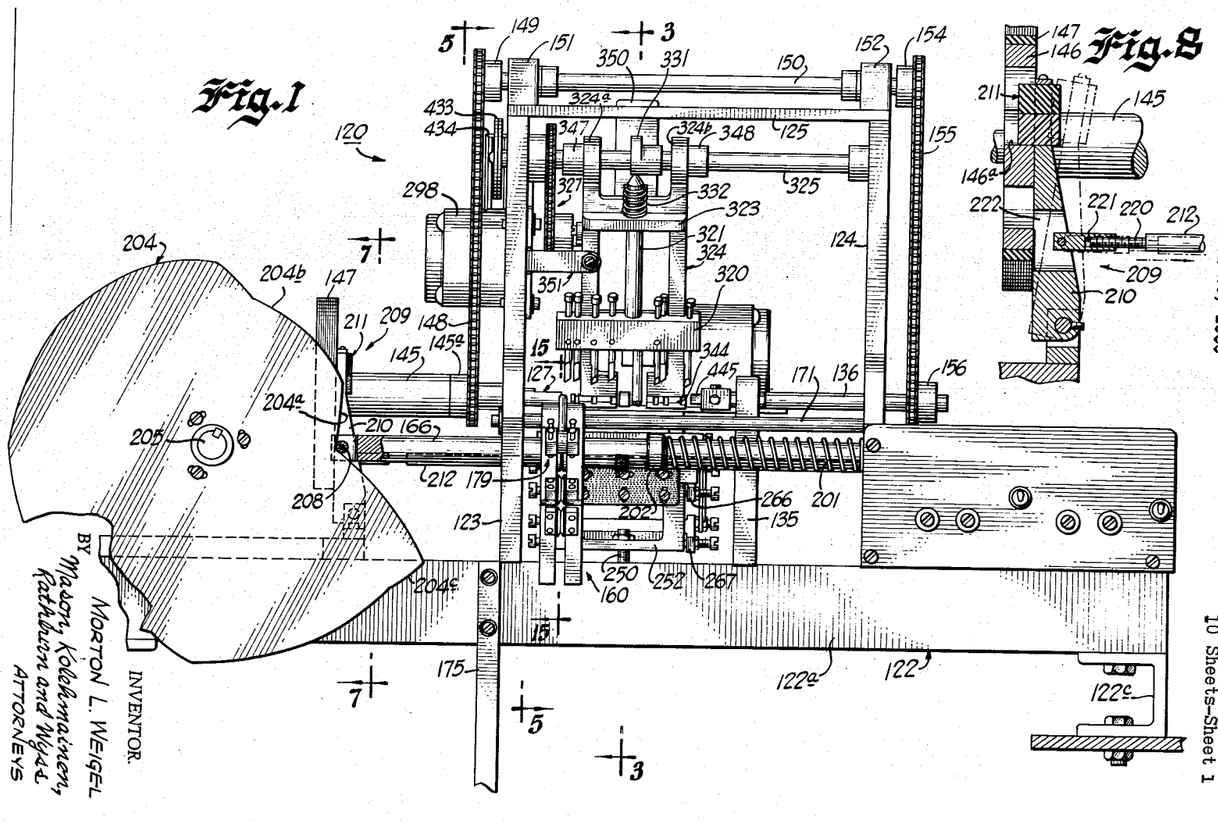
FIG. 1 is a front elevational view of a coil winding machine embodying the present invention, certain portions of the machine being broken away.
FIG. 8 is a sectional view taken along the line 8—8 of FIG. 7 assuming the entire machine to be shown therein.
Figures 2, 9, 10:
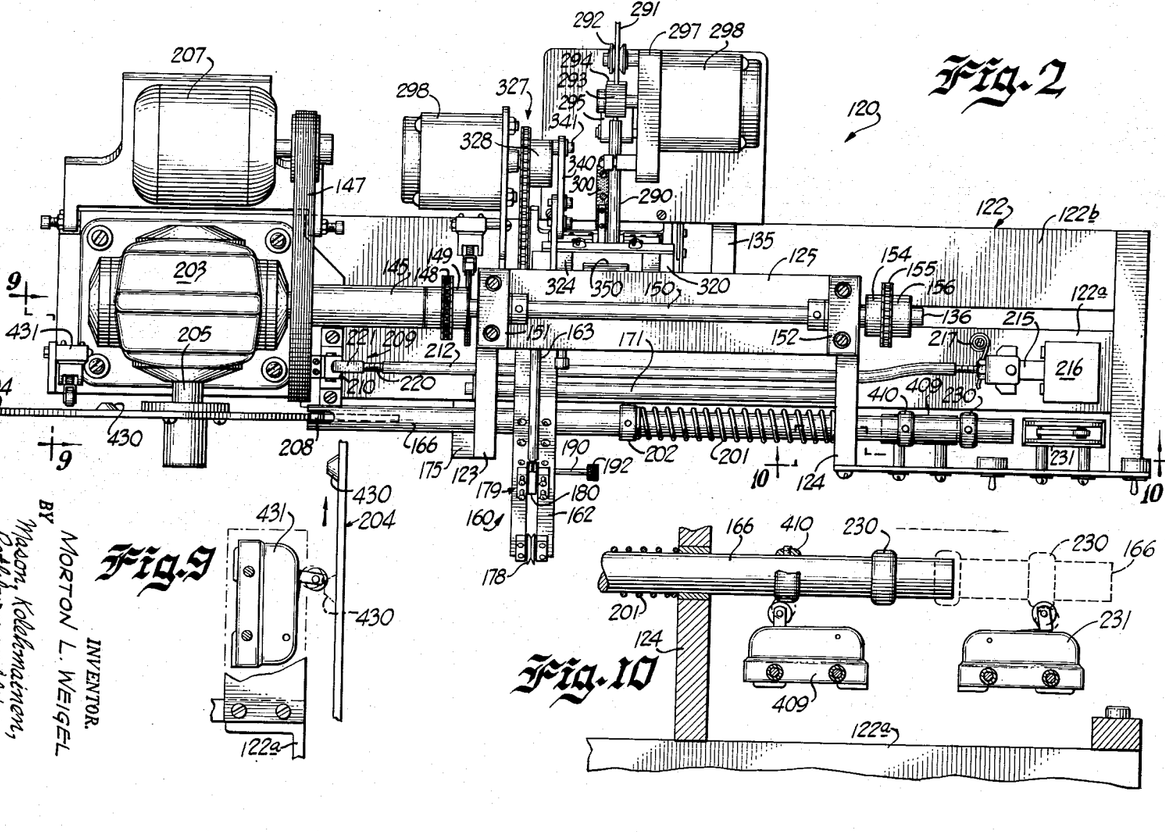
FIG. 2 is a plan view of the coil winding machine shown in FIG. 1.
FIG. 9 is a sectional view taken along the line 9—9 of FIG. 2.
FIG. 10 is a sectional view taken along the line 10—10 of FIG. 2.

Referring now to FIGS. 1 and 2, there is shown a machine 120 which may be used for automatically assembling the multiple inductance units 100. The machine 120 comprises a bed 122 which is formed by a pair of channel members 122a and 122b disposed in face-to-face relationship and tied together at their ends by suitable cross braces 122c, and a pair of uprights 123 and 124 which are mounted on the channels 122a and 122b and held together at the top of a plate 125 which lies across the upper ends of the uprights 123 and 124.

Figures 3, 11:
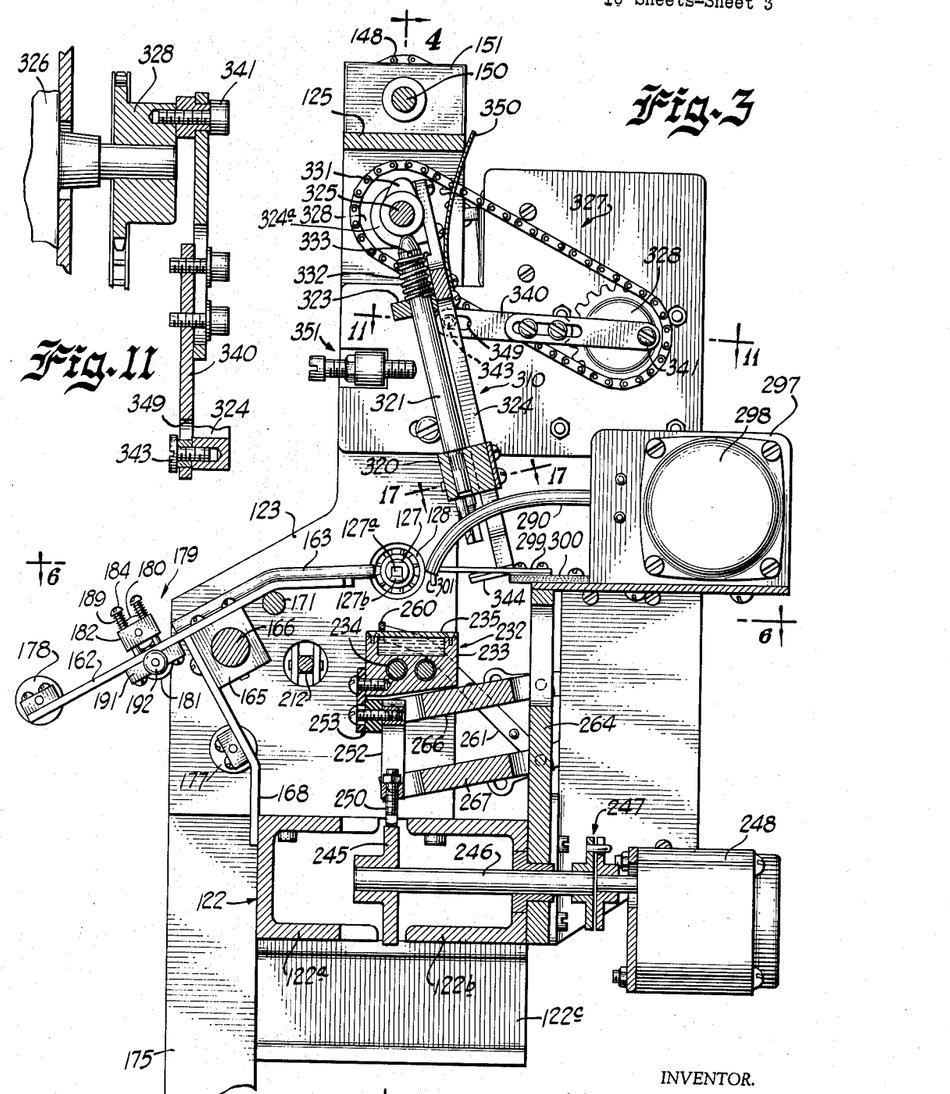
FIG. 3 is a sectional view taken along the line 3—3 of FIG. 1.
FIG. 11 is a sectional view taken along the line 11—11 of FIG. 3 assuming the entire machine to be shown therein.

In order to support a coil form in the machine 120 during the assembly operation, there is provided a headstock collet 127, which is suitably journaled by means of a ball bearing assembly 128 in an aperture 129 in the upright 123, and a tailstock collet 132 which is suitably journaled by means of a ball bearing assembly 133 in an aperture 134 in an auxiliary upright 135 which is mounted on the channels 122a and 122b between the principal uprights 123 and 124. As best shown in FIG. 3, the collet 127 has a generally rectangular recess 127a in the face thereof for reception of one end of the coil form, and the face of the collet 132 is provided with a face 132a of substantially the same shape for receiving the other end of the coil form. Placing of the coil forms in the collets is facilitated by tapered walls 127b and 132b thereof which partially define the recesses 127a and 132a in the respective collets.

Figure 4:
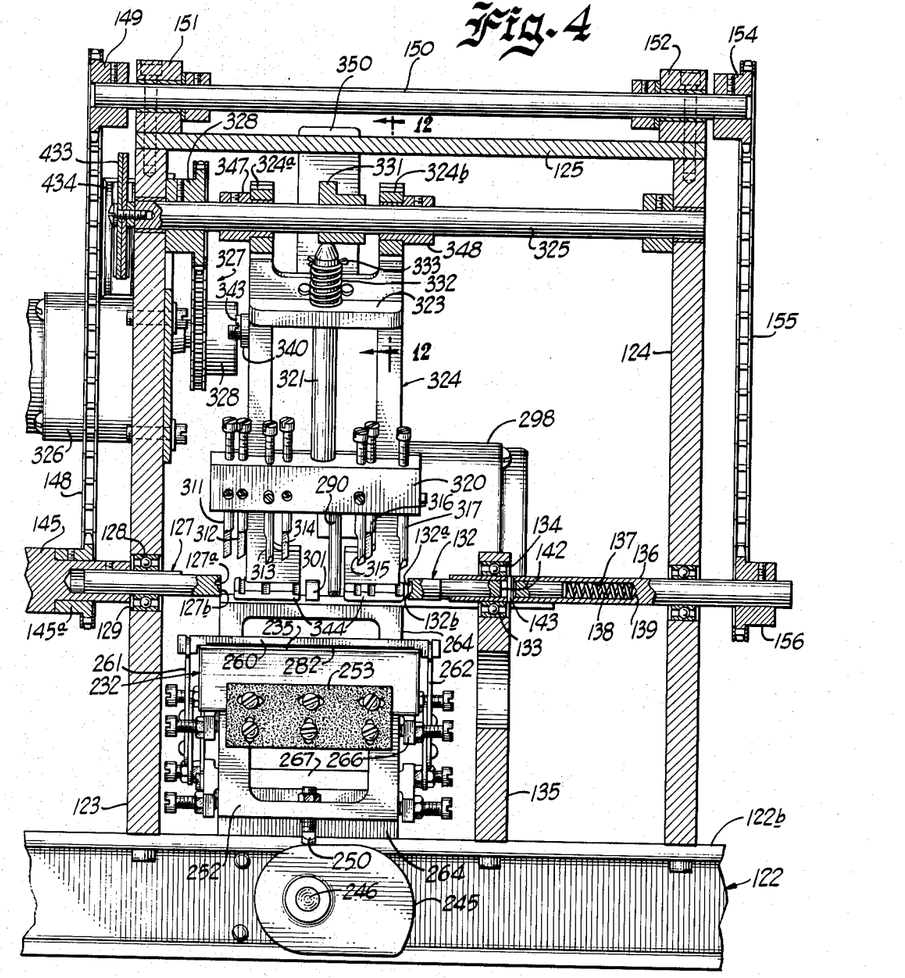
FIG. 4 is a sectional view taken along the line 4—4 of FIG. 3 assuming the entire machine to be shown therein.
Figure 6:
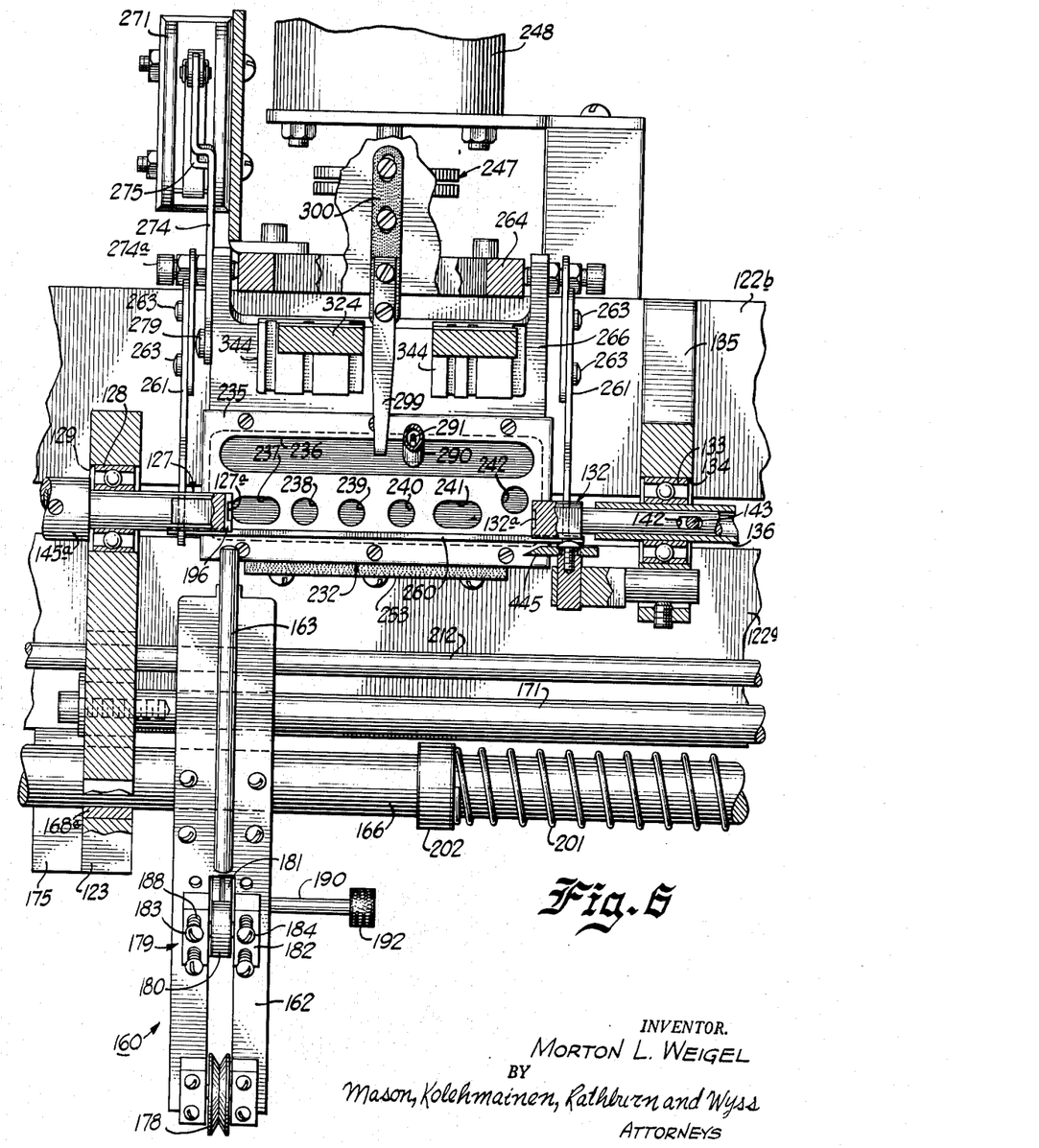
FIG. 6 is a sectional view taken along the line 6—6 of FIG. 3 assuming the entire machine to be shown therein.

In order to hold the coil form in the machine, the collets 127 and 132 are resiliently biased toward one another to apply an axial compressive force on the coil form, and to this end the tailstock collet 132, as best shown in FIGS. 4 and 6, is mounted in a cylindrical bore 137 of a tailstock drive shaft 136 and the collet 132 is urged toward the collet 127 by a coil spring 138 positioned between the bottom 139 of the hole 137 and the rear end of the collet 132. Axial movement of the collet 132 is limited by a pin 143 which is fastened at its ends in the tailstock drive shaft 136 and which extends through a slot 142 in the collet 132.

Figures 7, 13, 14:
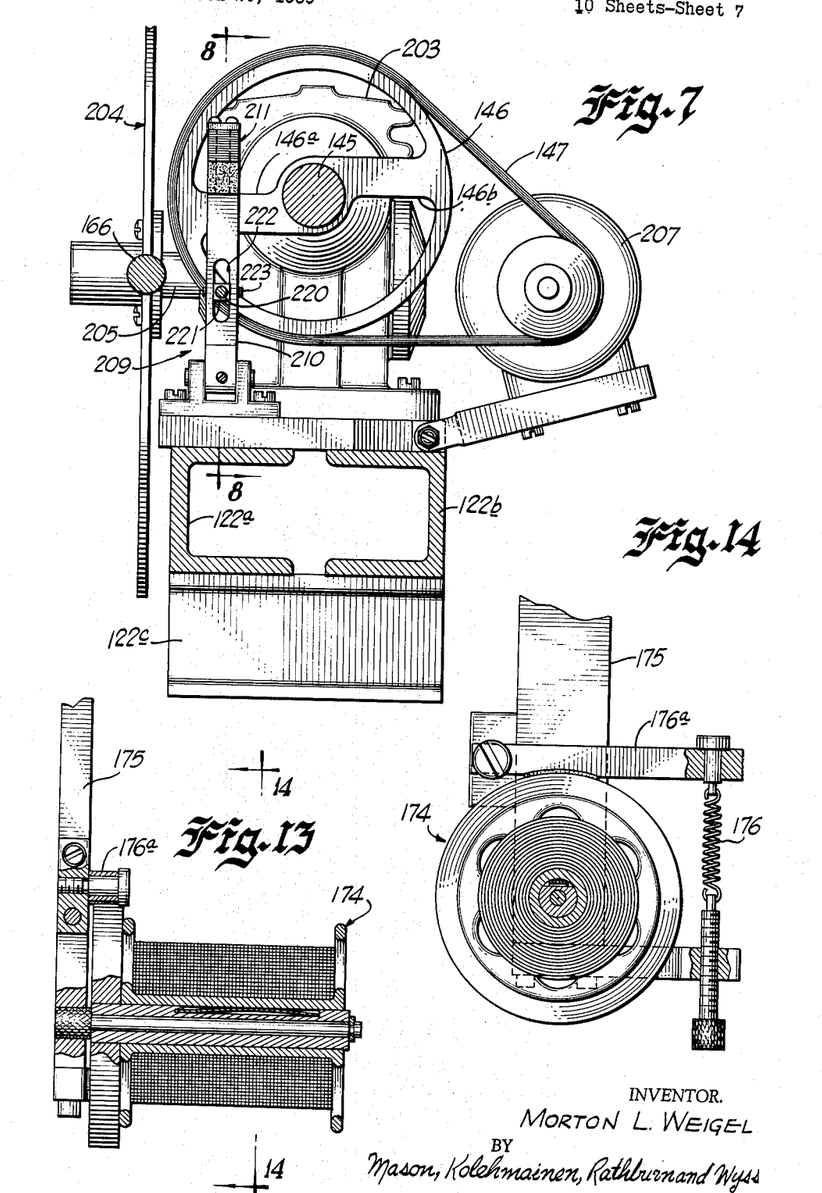
FIG. 7 is a sectional view taken along the line 7—7 of FIG. 1.
FIG. 13 is a sectional view showing the manner in which the wire supporting spool is mounted on the machine.
FIG. 14 is a sectional view taken along the line 14—14 of FIG. 13 assuming the entire device to be shown therein.

It is important that the coil form have a low dielectric loss, and therefore, it is preferably molded of a ceramic material which, at the present time, is necessarily quite brittle, and in order to prevent cracking of the coil form during the winding operation when the coil form is rotated, the headstock and tailstock collets 127 and 132 are driven simultaneously. Accordingly, the collet 127 is directly connected to a drive shaft 145, which, as best shown in FIG. 7, is connected by a pulley 146 and a belt 147 to a drive motor 207. A sprocket 145a is mounted on the end of the drive shaft 145 and is connected by means of a suitable link chain 148 to a sprocket 149 fastened to the end of an idler shaft 150 which is suitably journaled at its ends in bearings 151 and 152 mounted on the cross brace 125 directly above the uprights 123 and 124, respectively. A sprocket 154 is mounted on the other end of the shaft 150 and is connected by means of a chain 155 to a sprocket 156 mounted near the end of the tailstock drive shaft 136. Consequently, as the output shaft 145 rotates, the collets 127 and 132 rotate in unison thereby to minimize the shear stress exerted on the coil form during the winding operation.

Referring now to FIGS. 2, 3, and 6, the wire with which the coils are wound is supplied to the coil form by means of a wire feed carriage assembly 160 which is driven by the motor 207 along the length of the coil form. The assembly 160 comprises a support plate 162 on which an angulated wire guide tube 163 is mounted and which is fixedly secured to an apertured block 165. The block 165 is fixedly attached to a drive rod 166 which is suitably journaled for axial movement in the uprights 123 and 124. As best shown in FIG. 6, the rod 166 is mounted in a bushing 168a which is press-fitted into a suitable aperture in the upright 123 and a similar arrangement is provided in the upright 124 for supporting the other end of the rod 166. The carriage 160 further includes a guide bracket 168 which is fixedly secured to the block 165 and which depends therefrom for sliding engagement with the forward face of the channel 122a to guide the carriage 160 as it moves across the coil form. In addition, a guide rod or tie bar 171 is secured between the uprights 123 and 124 in parallel relationship with the headstock and tailstock collets 127 and 132, thereby to provide an additional guide surface across which the carriage 160 moves during the winding operation.

Figure 15:
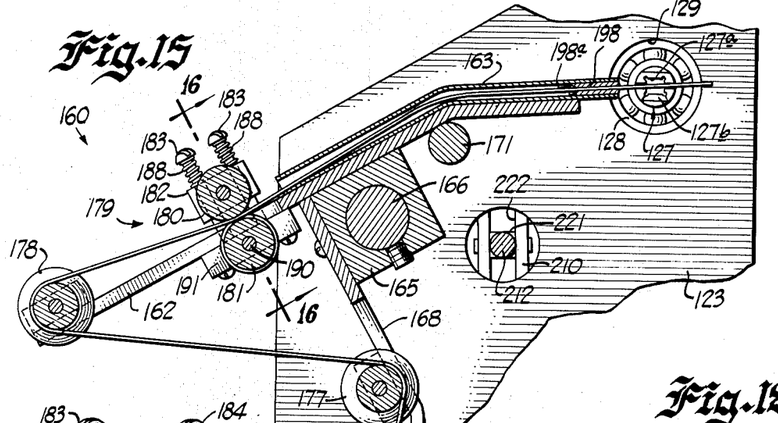
FIG. 15 is a sectional view taken along the line 15—15 of FIG. 1.
Figure 16:
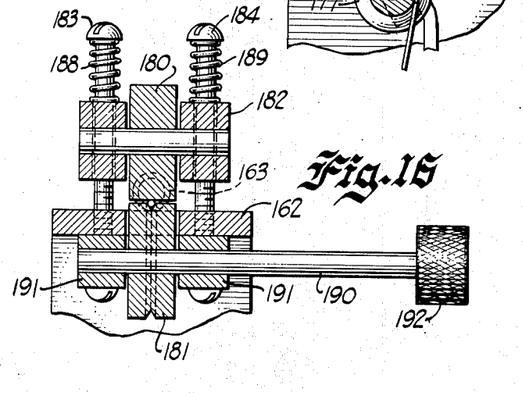
FIG. 16 is a sectional view taken along the line 16—16 of FIG. 15.

The wire to be wound on the coil form is supplied from a spool 174, best shown in FIG. 13, which is journaled in a bar 175 depending from the channel member 122a and is prevented from freely rotating by means of a spring 176, and friction bar 176a, see FIG. 14, thereby to maintain the wire taut during the winding of the coils. Referring to FIG. 15, it may be seen that the wire from the spool 174 is fed counterclockwise over a pulley 177 which is journaled on the bracket 168, clockwise over a pulley 178 which is rotatably mounted on the forward end of the support plate 162, and through a manual wire advance mechanism 179 to the guide tube 163. The advance mechanism 179 comprises a generally cylindrical pinch roller 180, best shown in FIG. 16, and an annularly grooved drive roller 181. The pinch roller 180 is journaled in a support block 182 which is slidably mounted on a pair of headed guide pins 183 and 184 for movement perpendicular to the principal axis of the drive roller 181. A pair of springs 188 and 189 which are respectively mounted between the heads of the pins 183 and 184 and the block 182 resiliently bias the roller 180 toward the roller 181, thereby to pinch the wire therebetween. Manual operation of the advance mechanism 179 is effected by rotating a knob 192 which is mounted on the end of a shaft 190 to which the roller 181 is attached. The shaft 190 is journaled in a bearing 191 mounted on the bottom of the plate 162.

At the start of an assembly operation the carriage assembly 160 is in the extreme left-hand position shown in FIG. 1 and the end of the guide tube 163 is aligned with a groove 196 formed in the face of the collet 127 so that when the knob 192 is rotated wire is fed into the groove 196. In order to assure that the wire to be fed is aligned with the groove 196, a bushing 198 having an internal diameter but slightly greater than the external diameter of the wire is mounted in the end of the guide tube 163, and the inner end 198a of the bushing 198 is conical so as to guide the end of the wire into the bushing when the wire is initially threaded through the guide tube 163. In FIG. 15 the wire is shown after it has been fed the proper distance through the groove 196 so that when operation of the machine is begun the rotation of the coil form 101 draws the wire through the guide tube 163 from the supply spool 174.

In order to move the carriage assembly 160 along the longitudinal axis of the coil form at predetermined rates while the coil form is being simultaneously rotated thereby to wind the coils thereon, an edge cam 204 engages a roller 208 mounted in the bifurcated end of the wire feed drive rod 166 so that as the cam 204 rotates, it pushes the rod 166 to the right (FIG. 1) against the force exerted thereon by a coil spring 201 which is interposed between a collar 202 fixedly mounted on the rod 166 and the upright 124. As shown in FIG. 1, the cam 204 is keyed to an output shaft 205 from a reduction gear assembly 203 which is driven from the drive shaft 145. Since the reduction gear assembly 203 and the collets 127 and 132 are driven from a common motor 207, the cam 204 and the coil form rotate in synchronism although at different rates.

Inasmuch as the four coils 110, 111, 112, and 113 have different inductance values and are spaced apart by different amounts, the cam 240 comprises a plurality of different sectors which respectively determine the pitches of the coils at the various positions along the coil form. For example, the first sector which has the edge portion 204a is very steep and its purpose is to lead the wire from the groove 196 over the solder lug of the first terminal 109. The second sector which has the edge portion 204b is less steep and causes the winding of one turn between the terminals 109 and 108. In a similar manner, the remaining sectors of the cam 204 control the winding of the remaining coils and connections between the terminals 102–107, inclusive.

Although the inductance units for each of the twelve VHF channels are different, they may all be made on the machine 120 by replacing the cam 204 with one having the proper shape to wind coils having the proper inductance value. Since there are twelve VHF channels at the present time, twelve differently shaped cams 204 are required for winding the required number of different multiple inductance units.

Upon completion of the winding operation, it is important that the coil form be stopped with the solder lugs 102a–109a, inclusive, on the bottom so the wire-to-terminal connections may be immersed in solder to provide the necessary low ohmic connections. At other times during the overall assembly operation the solder lugs should be on top. Therefore, in order to selectively stop the coil form in either of these positions, there is provided in accordance with a feature of the present invention a solenoid operated brake 209, best shown in FIGS. 7 and 8, which is operated at the time that the motor 207 is deenergized to selectively engage the spokes 146a or 146b of the pulley 146 and thereby precisely stop the coil form in the desired position.

The brake 209 includes an arm 210 which is pivotally mounted on the bed of the machine, and a block assembly 211 is fixedly mounted on the end of the arm 210 for engaging the spokes 146a and 146b. Preferably, the block assembly is formed of nylon to minimize bouncing of the pulley 146 when the brake is applied.

Referring to FIG. 2, operation of the arm 210 is controlled by a connecting rod 212 which is connected to the core 215 of a pusher type solenoid 216 located at the right-hand side of the machine and which is pivotally attached to the arm 210 by means of a connector 221. Adjustment of the stroke of the arm 210 is enabled by the threaded connection between the connector 221 and the end 220 of the rod 212. The brake arm 210 is biased out of interlocking engagement with the pulley 146 by means of a coil spring 217, which is located in proximity to the solenoid 216, whereby the brake is operated by energizing the solenoid 216 and released by deenergizing the solenoid. As more fully described in connection with FIG. 25 the motor 207 is controlled by switching contacts on the solenoid 216 so that when the solenoid is deenergized to release the brake 209 the motor 207 is energized to rotate the coil form. The manner in which the energization circuits of the solenoid 216 and of the motor 207 are controlled are also described more fully hereinafter in connection with FIG. 25.

At the completion of the winding operation the control rod 166 of the wire feed assembly 160 has moved to the righthand position shown in phantom in FIG. 10 and a collar 230 which is fixedly mounted thereon operates a limit switch 231 to energize the solenoid 216, to deenergize the motor 207, and to begin the soldering operation wherein the portions of the wire which are disposed within the bifurcated ends of the terminals on the coil form as shown in FIG. 20 are soldered to the solder lugs of the terminals in a dip-soldering operation. In order to make these solder connections, a solder pot 232 is elevated as shown in FIG. 21 to a position wherein the connections between the terminals and the wire are immersed in the solder. Thereafter, the solder pot 232 is lowered out of engagement with the terminals and a sufficient time delay is provided to insure that the solder has solidified before the next operation has commenced.

Figures 5, 12:
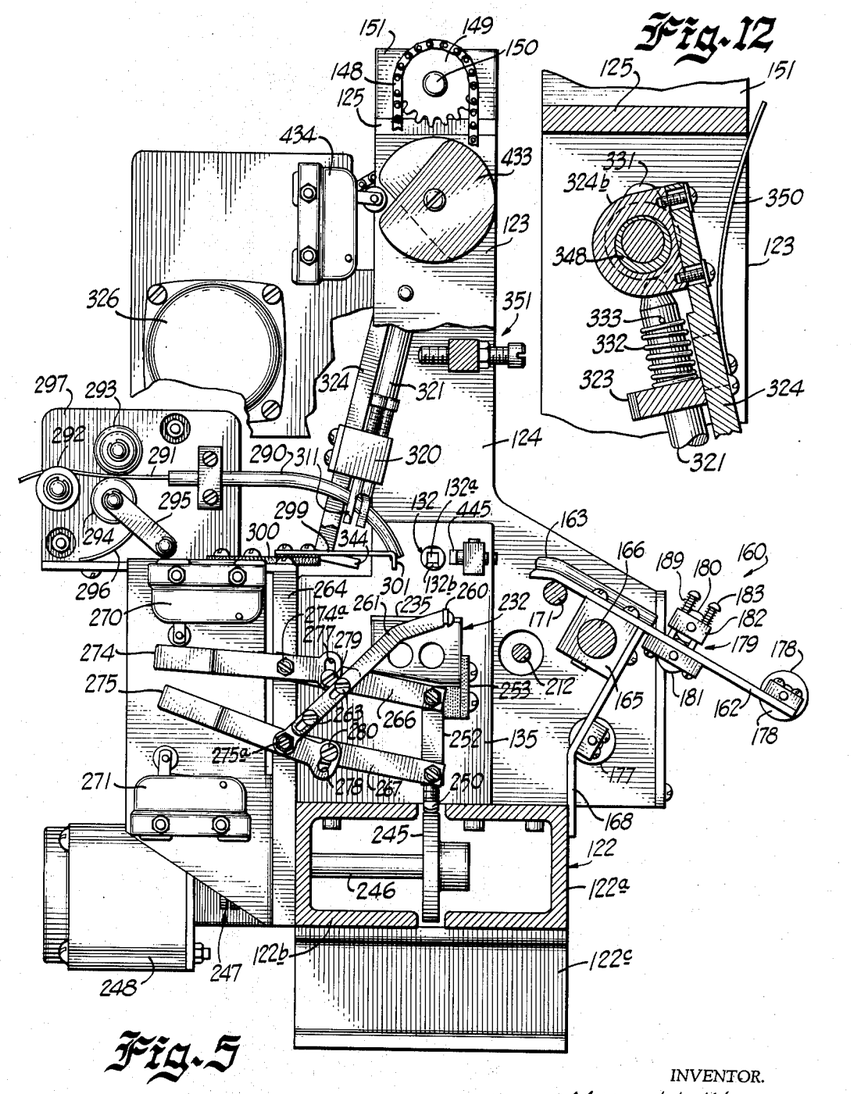
FIG. 5 is a sectional view taken along the line 5—5 of FIG. 1.
FIG. 12 is a sectional view taken along the line 12—12 of FIG. 4 assuming the entire machine to be shown therein.

Referring now particularly to FIGS. 3, 5, and 6, the solder pot 232 comprises a generally rectangular vessel 233 and a cover 235. The vessel has a heating element, such as a sheathed electrical heating element 234, embedded in the bottom thereof, and the cover 235 has an elongated slot 236 extending along one of its sides and a plurality of apertures 237, 238, 239, 240, 241, and 242 disposed directly beneath the location of the terminal members to be soldered. Accordingly, when the solder pot is elevated, the terminals on the coil form depend into the apertures 237, 238, 239, 240, 241, and 242, respectively, and the solder connections are made.

In order to elevate the solder pot at the completion of the winding operation, a cam 245 is mounted on a drive shaft 246 which is connected by a suitable coupling mechanism 247 to a motor 248, and inasmuch as a cam follower 250 is directly connected to the solder pot 232, as the cam 245 is rotated from the position shown in FIG. 3, the solder pot is elevated to the full line position shown in FIG. 21.

Considered in greater detail, the cam follower 250 is a threaded stud which is connected, as best shown in FIG. 4, to a solder pot support 252 on which the vessel 233 rests. An insulating bracket assembly 253 secures the vessel 233 to the support 252. Since the exposed surface of the heated solder reacts with the ambient air to form a surface oxide which is detrimental to a good solder connection, there is provided in accordance with the present invention means for scraping the oxidized layer from the surface of the molten solder each time that the pot is elevated. This scraping of the surface of the molten solder is accomplished by means of a scraper bar 260 which rests upon the cover 235 and is pulled back across a pair of linkages 261 and 262 which are fixedly attached at their upper ends to respective ends of the bar 260 and which are pivotally attached at their lower ends to an upright supporting member 264 which is mounted on the bed 122 and extends parallel to the front of the machine. Therefore, as the solder pot 232 is elevated, the vertical force which is exerted on the bar 260 by the cover plate 235 causes it to pivot counterclockwise about the pivotal axis of the linkages 261 and 262 and thus travel rearwardly across the top face of the cover 235. As shown best in FIG. 5, the linkages 261 and 262 each comprise two parts fixedly connected together by a pair of bolts 263 to enable adjustment of the lengths of the linkages to compensate for variations in the dimensions of the associated parts.

Referring to FIG. 4, the lower edge of the scraper bar 260 has an elongated, shallow recess 282 provided therein so that only the ends of the bar 260 physically engage the solder pot cover 235. However, there is a positive meniscus on the surface of the solder and, therefore, the surface of the solder is slightly higher than the top surface of the cover and as the bar 260 moves across the core the solder is engaged by the bottom of the recess 282 to remove any oxide or other foreign matter which may be floating thereon.

In order to keep the solder pot 232 in an upright position at all times, the solder pot support 252 is attached to the upright 264 by means of a pair of H-shaped linkage members 266 and 267 which are each pivotally attached at one end to the upright 264 and at the other end to the solder pot support 252. The spacing between the connections on the support 252 is equal to the spacing between the connections on the upright 264 thereby to maintain the linkage members 266 and 267 parallel which thus guide the solder pot support 252 in a vertical plane as it is elevated by the cam 245.

In accordance with another feature of the present invention, a pair of limit switches 270 and 271, which control the solder pot lift motor 248, are mounted on the upright 123 and are respectively operated by a pair of lever arms 274 and 275 which are pivotally supported on the upright 264 by a pair of screws 274a and 275a and connected to the linkages 266 and 267 by a pair of bolts 279 and 280. Adjustment is provided by a pair of slots 277 and 278 provided in the ends of the lever arms 274 and 275 through which the bolts 279 and 280 extend. Consequently, as the solder pot is elevated from the position shown in FIG. 5, the arms 274 and 275 are rotated in a counterclockwise direction about the screws 274a and 275a which initially releases the switch 270 and later operates the switch 271.

Referring now to FIG. 5, in order to maintain a predetermined level of solder in the vessel 233, there is provided in accordance with the present invention a solder feed mechanism which is responsive to the level of solder in the solder pot 232 to feed solder to the pot during the soldering operation. This mechanism comprises a curved feed tube 290 through which a strip of solder 291 is controllably supplied to the solder pot from a suitable supply of solder (not shown). The solder strip 291 coming from the supply first passes over an idler pulley 292 and then passes between a drive roller 293 and a pinch roller 294 before entering the tube 290. As shown, the pinch roller 294 is journaled in an arm 295 which is pivotally attached to a bracket 297 and biased by means of a flat spring 296 toward the drive roller 293 so that as the roller 293 is rotated in a counterclockwise direction the solder strip 291 is fed into the guide tube 290 and out the depending end thereof into the solder pot 232 through the elongated recess 236 provided in the cover plate 235.

The drive roller 293 as best shown in FIG. 2 is driven by a motor 298 which, as more fully described hereinafter, is controlled by means of a conductive probe 299 which is suitably mounted on the upright 264 by an insulating spacer 300 and has an off-turned, depending end 301 which is disposed directly above the slot 236 in the solder pot. The height of the probe 299 is adjusted so that with the solder pot 232 in the elevated position, as shown in FIG. 21, the solder strip 291 is supplied to the solder pot until the probe 299 contacts the solder. If the level of solder is below the tip of the probe, the motor 298 is energized and solder is fed to the solder pot.

After the solder pot has been elevated to the soldering position and the solder has flowed onto the connections between the coils and the terminals, the solder pot is lowered to the position shown in FIG. 4, the brake solenoid 216 is momentarily deenergized and the motor 207 is momentarily energized to rotate the coil form through 180 degrees whereby the solder lug portions of the terminals are rotated to the top position. A guillotine mechanism 310 comprising a plurality of knives 311, 312, 313, 314, 315, 316, and 317 is then lowered into a wire engaging position as shown in FIG. 22 to sever from the terminals those portions of the wire which should not be present in the completed multiple inductance unit. For example, the knife 311 severs the wire to the left (as viewed in FIG. 20) of the end terminal 109, and since seven such cuts are required the knives 311–317 are eight in number.

Figure 17:
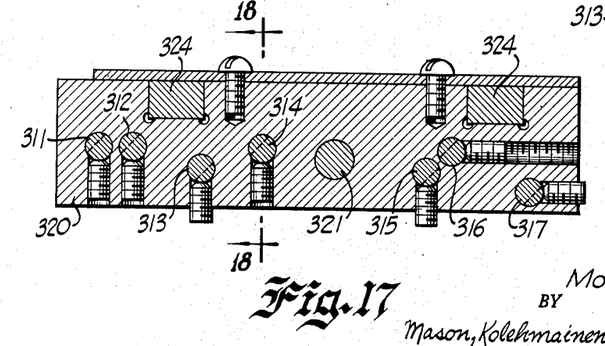
FIG. 17 is a sectional view taken along the line 17—17 of FIG. 3 assuming the entire machine to be shown therein.
Figure 18:
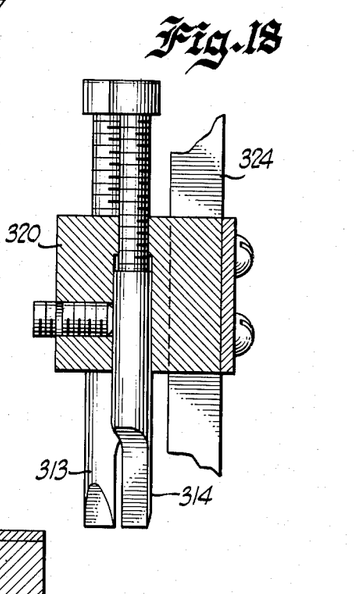
FIG. 18 is a sectional view taken along the line 18—18 of FIG. 17.

The knives 311–317, inclusive, are adjustably mounted in a support block 320, as best shown in FIGS. 17 and 18, which is slidably supported on a swing or pendulum support 324 and attached to a drive rod 321 which extends through a suitable aperture in a flange 323 on the support 324. The block 320 is moved up and down along the support 324 by axial movement of the rod 321, and a coil spring 332, which is interposed between the flange 323 and a cotter pin 333 in the end of the rod 321 biases the block 320 in a retracted position. The swing support 324 hangs from a guillotine drive shaft 325 which is journaled at its end in the uprights 123 and 124 and is driven by a drive motor 326 which is connected to the shaft 325 by a chain and sprocket assembly 327. A cam 331 which is mounted on the shaft 325 selectively forces the rod 321 against the force of the spring 332 to lower the block 320 at the proper time to cut the wire.

Referring to FIG. 3, the chain and sprocket assembly 327 comprises a drive sprocket 328 which is directly connected to the drive shaft of the motor 326, and in order to controllably swing the support 324 forward to a position where the knives 311–317 are directly above the coil form, an arm 340 is connected at one end to the sprocket 328 by means of a pintle 341 and is connected at its other end to the support 324 by a pintle 343. Consequently, as the sprocket 341 rotates, the support pivots forward under the force of a flat spring 350, which is attached to the support 324 and bears against the rear edge of the plate 125, against an adjustable stop 351 mounted on the upright 123. The cam 331 is so positioned on the shaft 325 that after the support 324 has been lowered the rod 321 is then depressed to move the knives 311–317 through the cutting stroke.

The coil forms are, at present, quite brittle and might be broken by the shear stress exerted thereon by the knives 311–317, and in order to prevent this, a shelf 344 is attached to the bottom of the swing support 324 for supporting the coil form throughout its length during the cutting operation. Since even a slight bending of a coil form might crack it, it is important that the shelf actually engage the coil form before the knives 311–317 engage the wire, and therefore, in accordance with one aspect of the present invention the swing support 324 initially swings forward to position the shelf 344 beneath the coil form and the support 324 is then elevated to lift the shelf 344 into engagement with the terminals of the coil form. To this end a pair of arms 324a and 324b on the support 324 are suitably journaled on a pair of cams 347 and 348, best shown in FIGS. 4 and 12, which are secured to the drive shaft 325 and which elevate the support 324 after it has been swung into the forward position. A lost motion connection is provided by a slot 349 in the arm 340 to permit the cams 347 and 348 to elevate the spring support 324 with the support 324 in the forward position, and to permit the spring 350 to hold the support in the forward position while the knives 311–317 cut the wire.

Figure 19:
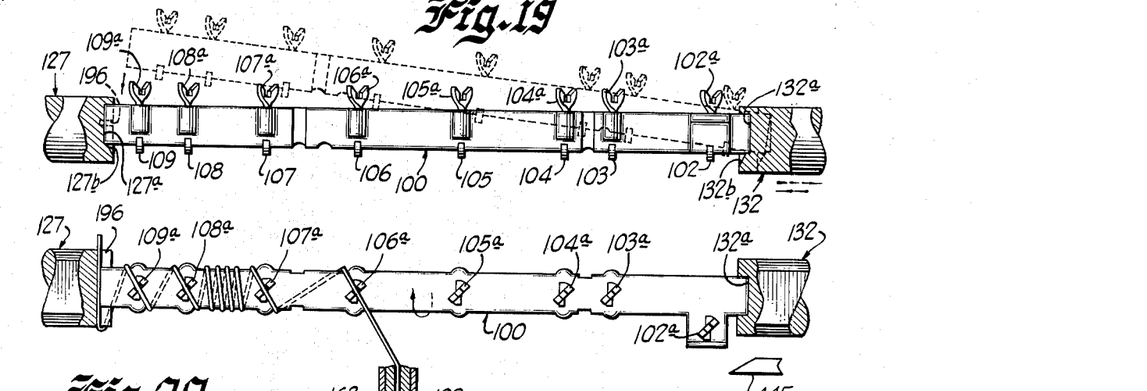
FIG. 19 is a view showing the manner in which a coil form is mounted in the machine of FIG. 1.

The remaining features of the machine may best be understood in relation to an overall cycle of operation of the machine. Therefore, referring to FIG. 19, let it be assumed that a coil form is placed in the collets 127 and 132 in the manner shown and the control knob 192 of the wire feed mechanism has been rotated so as to feed the wire into the slot 196 in the collet 127 across the end of the coil form as shown in FIG. 15.

Figure 25:
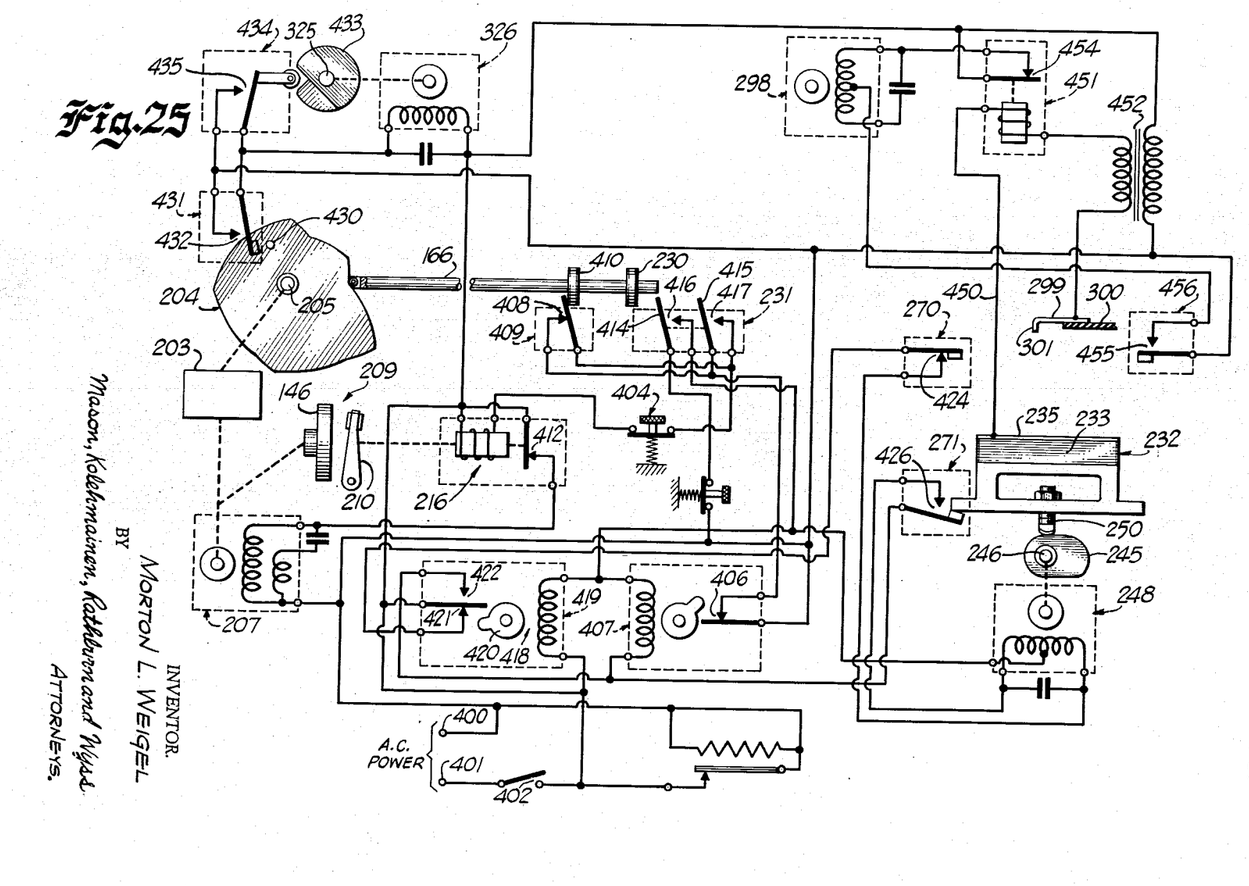
FIG. 25 is a schematic diagram of the control circuit of the winding machine of FIG. 1.

Referring now to FIG. 25, which is a schematic diagram of the control circuit of the machine 120, with power applied across the input terminals 400 and 401 (FIG. 25) and with the main power switch 402 closed, the brake solenoid 216 is deenergized by momentarily depressing and thus opening a normally closed start switch 404 which is serially connected in the energization circuit of the solenoid 216. As shown, the solenoid 216 is energized with the switch 404 in the released position through a circuit beginning at the power terminal 400 and continuing through a set of normally closed contacts 406 on a delay timer 407, through a set of normally closed contacts 408 on a limit switch 409 which is actuated by a collar 410 on the wire feed assembly drive rod 166 when the rod is in the extreme left-hand position, through the switch 404 to one side of the solenoid and from the other side of the solenoid to the main power switch 402 which is connected to the other power terminal 401. Therefore, before a cycle of operation is commenced by depressing the start button 404, the solenoid 216 is energized which maintains the brake arm 210 in engagement with the pulley 146 to prevent its rotation. However, when the switch 404 is depressed, the solenoid 216 is released and the return spring thereon releases the brake so that the pulley 146 may be rotated. Also, when the solenoid 216 is released a set of normally closed contacts 412 which it controls are closed to complete the energization circuit for the main drive motor 207. Accordingly, the coil form is rotated by the collets 127 and 132 and at the same time the cam 204 is rotated to push the wire feed drive rod 166 to the right against 201. This moves the collar 410 away from the limit switch 409 so that the normally open contacts 408 thereof open and since these contacts are serially connected in the energization circuit for the solenoid 216 the solenoid 216 remains deenergized even though the actuating button of the switch 404 is released. The winding operation thus continues until the collar 230 engages a pair of ganged armatures 414 and 415 of the limit switch 231 thereby to close two sets of normally closed contacts 416 and 417, respectively. Closure of the contacts 416 completes an energization circuit for a motor 418 of a solder timer 419 which includes a cam 420 which controls a set of normally closed contacts 421 and a set of normally open contacts 422. Also, at this same time when the contacts 417 in limit switch 231 close, the energization circuit for the solenoid 216 is again completed and the solenoid 216 thereby operates to push the brake arm 210 into engagement with the pulley 146 to stop the rotation thereof and it also opens the contacts 412 which deenergize the motor 207. Moreover, when the contacts 416 close they also complete an energization circuit for the solder pot motor 248. This latter energization circuit includes a set of normally closed contacts 424 in the upper limit switch 270 and the normally closed contacts 421 in the solder timer 419. Accordingly, the cam 245 is rotated and elevates the solder pot 232 so as to immerse the solder lugs in the solder in the manner discussed hereinbefore. As the pot 232 is elevated, a set of normally open contacts 426 in the lower limit switch 271 close to partially complete an energization circuit for the delay timer 407, and also to partially complete an alternate energization circuit for the solder pot lift motor 248. The remainder of these circuits comprises the contacts 422 of the solder timer 419. At the upper extreme of its travel the pot 232 opens a set of contacts 424 in the limit switch 270 to deenergize the motor 248 and stop the solder pot 232 in the elevated position.

A predetermined time after the solder timer 419 has been energized, which time is sufficient to insure that the solder has properly wetted the connections and that the solder pot 232 has been again filled with solder, the cam 420 opens the contacts 421 and closes the contacts 422. Closure of the contacts 422 which are serially connected with the normally open contacts 426 in the energization circuit of the motor 248 again energizes the motor 248 and at the same time completes an energization circuit for the delay timer 407. The lift motor 248 thus operates and the cam 245 permits the solder pot 232 to fall under the force of gravity to the bottom position where it opens the contacts 426 and deenergizes the motor 248. Although the switch contacts 424 in the upper limit switch 270 are closed at this time, the motor 248 is not energized through that circuit inasmuch as the contacts 421 on the solder timer 419 are now open.

During the winding operation and prior to the actuation of the limit switch 231 by the collar 230 on the drive rod 166, a boss 430 on the face of the cam 204, see FIG. 9, operates a limit switch 431 to close a set of normally open contacts 432 thereof and thereby energize the guillotine drive motor 326. Rotation of the shaft of the motor 326 in addition to causing the guillotine mechanism to move toward the coil form rotates a switch actuating cam 433, see FIG. 5, which operates a switch 434 to close a set of normally open contacts 435 thereof. The contacts 435 are connected in parallel with the contacts 432 and thus comprise holding contacts which maintain the motor 326 energized until it has completed one revolution. Therefore, while the solder pot 232 is being lowered, and shortly after it has been moved out of engagement with the terminals on the coil form, the guillotine support 324 is swung forward into the coil form engaging position and the knives 311–317, inclusive, are depressed to sever the wire on the coil form. As shown in FIG. 22, the knives move in close proximity to the terminals to insure a good cut and where a section of wire is to be removed, as for example, between the terminals 103 and 104, two cuts are made, one at each terminal. Accordingly, when the coil form is removed from the collets 127 and 132, the unwanted piece of wire falls from the coil form. Thereafter the continued rotation of the guillotine motor 326 lifts the knives and swings the guillotine mechanism out of engagement with the coil form. However, prior to the movement of the guillotine into a cutting position and after the solder pot 232 has moved out of engagement with the coil form, the timer 407 opens the contacts 406 thereby to deenergize the solenoid 216 and to energize the motor 206 for a brief time sufficient for the coil form to be rotated through 180 degrees.

After the unwanted connections on the coil form have been severed by the guillotine, and the solder pot 232 has been lowered to the bottom position, the delay timer 407 opens the contacts 406 to deenergize the solenoid 216 and to energize the drive motor 207. The cam 204 then completes its cycle of operation. As it rotates, a steep rise portion 204c pushes the rod 166 to the right thereby to move the wire which extends from the wire feed tube 163 to the terminal 102 against a cutter blade 445, shown best in FIG. 5, to sever the wire. The cutter 445 is mounted on the upright 135 and is positioned so that as the wire feed guide 163 moves to the right under the control of the drive rod 166, the end of the tube 163 moves in very close proximity to the edge of the cutter 445, as shown in FIG. 23, thereby to cut the wire without bending it so that at the beginning of the next operation when the wire feed mechanism 179 is operated, the wire feeds nicely into the slot 196 in the headstock collet 127. The cam 204 thus continues to operate until it returns to the initial position, as shown in FIG. 25, wherein the normally closed contacts 408 in the limit switch 409 are closed, thereby to energize the solenoid 216 and deenergize the motor 207.

In order to maintain the level of solder in the solder pot 232 at a predetermined level, there is provided in accordance with the present invention a solder feed mechanism control circuit which operates when the solder pot is in the elevated position to detect the level of solder in the pot and to supply enough solder to the pot to bring the level up to the desired height. In this circuit the solder pot, which is formed of a good conductor, is connected by means of a conductor 450 to one side of the operating coil of a relay 451, the other side of the operating coil being connected through the secondary winding of power transformer 452 to the probe 299. Accordingly, when the solder pot is in an elevated position and the probe 299 engages the solder, an energization circuit for the relay 451 is completed and a set of normally closed contacts 454 thereof are opened. The contacts 454 are serially connected with the primary winding of the transformer 452 and a set of normally open contacts 455 on a limit switch 456, which, if desired may be included in the limit switch 270 instead of being provided in a separate switch, are closed to complete an energization circuit for the solder feed motor 298. When, therefore, the solder pot 232 is in an elevated position and the contacts 455 are closed, the solder feed motor 298 is energized to feed solder to the solder pot 232 until the probe 299 engages the solder thereby to energize the relay 451 and open the contacts 454 to deenergize the motor 298.

There is thus provided in accordance with the present invention semiautomatic assembly apparatus for manufacturing multiple inductance units of the type suitable for use in turret tuners of the type described hereinbefore. Coil forms having terminals previously affixed thereto are merely placed in the headstock and tailstock collets 127 and 132 and the start button 404 is depressed at the proper times to automatically and completely assemble the unit.

While the particular embodiments of the invention have been shown, it will be understood, of course, that it is not desired that the invention be limited thereto since modifications may be made, and it is, therefore, contemplated by the appended claims to cover any such modifications as fall within the true spirit and scope of the invention.

Having thus described the invention, what is claimed as new and desired to be secured by Letters Patent of the United States is:

1. Apparatus for manufacturing multiple inductance units of the type comprising a coil form having a plurality of terminals in spaced apart relationship thereon and a plurality of coils wound on said form and connected between predetermined ones of said terminals, said apparatus comprising support means for supporting said coil form, drive means for rotating said coil form, a wire feed mechanism for supplying wire to said coil form, means for moving said feed mechanism parallel to the axis of rotation of said coil form simultaneously with the rotation of said form, a solder pot having an open top, said pot being mounted below said coil form, means operative upon completion of the winding of said wire on said coil form for elevating said pot so that solder contained in said pot engages said terminals and the adjacent portions of the wire, means for then lowering said pot to move said solder out of engagement with said terminals, and wire removal means movable into engagement with selected portions of the wire wound on said coil form after said pot has been lowered to remove undesired wire connections from said units.

2. Apparatus as set forth in claim 1 which further includes means operative when said pot is lowered for rotating said coil form one half turn, and said wire removal means is mounted above said coil form and lowered into engagement with said wire.

3. Apparatus as set forth in claim 1 wherein said support means comprises a pair of collets for engaging the ends of said coil form and means for resiliently biasing said collets toward one another.

4. Apparatus as set forth in claim 2 wherein said wire removal means comprises a guillotine mechanism including a plurality of knives which are pressed into engagement with selected portions of the wire wound on said coil form.

5. Apparatus as set forth in claim 4 wherein said knives engage said wire in proximity to said terminals.

6. Apparatus for manufacturing multiple inductance units of the type comprising a coil form having a plurality of terminals in spaced apart relationship thereon and a plurality of coils wound on said form and connected between predetermined ones of said terminals, said apparatus comprising support means for supporting said coil form from the ends thereof, drive means for rotating said coil form about a longitudinal axis thereof, a wire feed mechanism for supplying wire to said coil form under tension, means for moving said feed mechanism parallel to the axis of rotation of said coil form simultaneously with the rotation thereof, a solder pot having an open top, said pot being mounted below said coil form, means operative upon completion of the winding of said wire on said coil form for elevating said pot so that solder contained therein engages said terminals and the adjacent portions of the wire, means for lowering said pot to move said solder out of engagement with said terminals, wire removal means movable into engagement with selected portions of the wire wound on said coil form after said pot has been lowered to remove undesired wire connections from said units, and means for severing the wire connection between said wire feed mechanism and said coil form.

7. In assembly apparatus in which a plurality of coils are wound with a single wire on a coil form and selectively connected to a plurality of terminals mounted on said coil form, a guillotine comprising a support, support means from which said support is pivotally suspended, a guide member slidably mounted on said support for guided movement perpendicular to the longitudinal axis of said shaft, cutting means mounted on said guide member, drive means for swinging said cutting means to a position above said coil form and for then depressing said cutting means into engagement with the wire wound on said coil form, and a shelf mounted on said support for movement beneath said coil form when said cutting means is swung to the position above said coil form, and means operable before said cutting means engages said wire for elevating said shelf into effective engagement with the bottom of said coil form.

8. A guillotine as set forth in claim 7 wherein said support means comprises a rotatable cam which engages said support to elevate said shelf into engagement with said coil form.

9. A guillotine as set forth in claim 7 wherein said support means comprises a drive shaft, and cam means is secured to said shaft for selectively depressing said cutting means.

10. Apparatus for winding a plurality of coils on a coil form which includes a plurality of terminals thereon, comprising means for winding a length of wire on said coil form to provide a plurality of coils interconnected between respective ones of said terminals, a solder pot for containing a supply of solder in which said terminals and the connecting portions of said wire are immersed for soldering, means for elevating said pot so that solder contained therein engages said terminals and the adjacent portions of the wire, and means for maintaining a fixed quantity of solder in said pot, said means including a probe fixedly mounted on said apparatus for engagement with said solder only when said solder is at a predetermined level, and automatic means for feeding a solid strip of solder to said pot until said probe engages said solder.

11. Apparatus for manufacturing multiple inductance units, comprising means for winding a piece of wire on a single coil form into a plurality of axially disposed coils, means operative upon completion of said winding for soldering the ends of said coils to terminals on said coil form, and means operative when the solder has solidified for severing portions of said wire between selected ones of said terminals to separate predetermined ones of said coils on said single coil form.

12. Apparatus as set forth in claim 11 wherein said coils are formed by winding a single coil of variable pitch on said coil form, the changes in pitch occurring at least at the locations of predetermined ones of said terminals.

13. Coil winding apparatus as set forth in claim 11 wherein said soldering means is mounted on one side of said coil form, said severing means is mounted on the opposite side of said coil form, and said coil form is inverted between the soldering operation and the severing operation.

14. Coil winding apparatus comprising means for winding a single, variable pitch coil on a coil form, means for connecting intermediate portions of said coil to terminal members on said coil form, and means for removing portions of said coil disposed between selected ones of said terminals on the coil form, thereby to provide a plurality of separate coil units disposed along the length of said coil form.

15. Coil winding apparatus as set forth in claim 14 wherein said connecting means includes a soldering mechanism for soldering said intermediate portions of said coil to said terminal members, and said removing means comprises a cutting mechanism for severing the wire at two places between said selected ones of said terminals.

16. Apparatus for manufacturing multiple inductance units of the type comprising a coil form having a plurality of terminals in spaced apart relationship thereon and a plurality of coils wound on said form and connected between predetermined ones of said terminals, said apparatus comprising means for supporting said coil form and winding a single coil thereon, solder containing means, means operative after completion of the winding of said coil on said coil form for causing relative movement between said coil form and said solder containing means so that solder contained therein engages said terminals and the adjacent portions of said coil, means for causing relative movement between said coil form and said solder containing means to move said solder out of engagement with said terminals, and wire removal means for removing selected portions of the wire wound on said coil form, thereby to provide electrically separate coils on said coil form.

17. Apparatus for manufacturing multiple inductance units of the type comprising a coil form having a plurality of terminals mounted thereon in spaced apart relationship and a plurality of coils wound on said form and connected between predetermined ones of said terminals, said apparatus comprising means for supporting said coil form and winding a single coil thereon with portions of said coil positioned on said terminals, a solder pot, means operative after completion of the winding of said coil on said coil form for causing relative movement between said coil form and said solder pot so that solder contained therein engages said terminals and the adjacent portions of said coil, means for causing relative movement between said coil form and said solder pot to move said solder out of engagement with said terminals, and wire removal means for removing selected portions of the wire wound on said coil form, thereby to remove undesired wire connections between said coils.

18. Apparatus for manufacturing multiple inductance units of the type comprising a coil form having a plurality of terminals extending transversely through said coil form in spaced apart relation and a plurality of coils wound on said form and connected between predetermined ones of said terminals, said apparatus comprising means for supporting said coil form and winding a single coil thereon with portions of said coil in engagement with different ones of said terminals, solder containing means, means operative upon completion of the winding of said coil on said coil form for causing relative movement between said solder containing means and said coil form so that solder contained therein engages said terminals and the adjacent portions of said coil, and means for removing portions of the wire wound on said coil form between selected ones of said terminals after the solder has solidified, thereby to provide separate inductance coils on said coil form.

19. Apparatus for manufacturing multiple inductance units of the type comprising a coil form having a plurality of terminals having notched end portions and extending transversely through said coil form in spaced apart relation and a plurality of coils wound on said form and connected between predetermined ones of said terminals, said apparatus comprising means for supporting said coil form and winding a single coil thereon with portions of said coil positioned within the notched end portions of said terminals, solder containing means, means operative upon completion of the winding of said coil on said coil form for causing relative movement between said solder containing means and said coil form so that solder contained therein engages said terminals and the adjacent portions of said coil, and means for removing portions of the wire wound on said coil form by severing the wire adjacent selected ones of said terminals after the solder has solidified, thereby to provide separate inductance coils on said coil form.

20. Apparatus for manufacturing multiple inductance units of the type comprising a coil form having a plurality of terminals having notched end portions and extending transversely through said coil form in spaced apart relation and a plurality of coils wound on said form and connected between predetermined ones of said terminals, said apparatus comprising means for supporting said coil form and winding a single coil thereon with portions of said coil having a sufficiently coarse pitch to extend across the end portions of said terminals with the wire positioned in the notches thereof, solder containing means, means operative upon completion of the winding of said coil on said coil form for causing relative movement between said solder containing means and said coil form so that solder contained therein engages said terminals and the adjacent portions of said coil, and means for removing portions of the wire wound on said coil form by severing the wire adjacent the notched end portions of selected ones of said terminals after the solder has solidified, thereby to provide separate inductance coils on said coil form.

21. Apparatus for manufacturing multiple inductance units of the type comprising a coil form having a plurality of terminals extending transversely through said coil form in spaced apart relation and a plurality of coils wound on said form and connected between predetermined ones of said terminals, said apparatus comprising means for supporting said coil form and winding a single coil thereon with portions of said coil in engagement with different ones of said terminals, solder containing means, means operative upon completion of the winding of said coil on said coil form for causing relative movement between said solder containing means and said coil form so that solder contained therein engages said terminals and the adjacent portions of said coil, and means for pressing a plurality of knives into engagement with selected portions of the wire wound on said coil form to sever the same after the solder has solidified, thereby to provide separate inductance coils on said coil form.

22. Apparatus for manufacturing multiple inductance coil units, comprising means for winding a piece of wire on an elongated coil form having terminals extending therethrough and spaced along the length thereof in such manner as to provide a plurality of inductance coils the end turns of which are wound over portions of predetermined ones of said terminals, said inductance coils being connected together by an intervening portion of said wire, means operative upon the completion of the winding of said coils for simultaneously conductively bonding the ends of said coils to said portions of said terminals by immersing the same in molten solder, and means operative after the solder has solidified for simultaneously severing said intervening portion of said wire, thereby to provide electrically separate coils on said coil form.

23. Apparatus for manufacturing multiple inductance coil units, comprising means for winding a piece of wire around an elongated coil form having spaced terminals provided with wire receiving end portions projecting from one side thereof in such manner as to provide a plurality of inductance coils spaced along the length of said coil form and connected by an intervening portion of said wire, said winding means being arranged to provide a winding pitch in the vicinity of predetermined ones of said terminals such that said wire lays in said wire receiving end portions of said predetermined ones of said terminals as said coils are wound on said coil form, means operative after said coils have been wound on said coil form for soldering the ends of said coils to said terminals, and means operative after the solder has solidified for severing said intervening portion of said wire, thereby to provide electrically separate coils on said coil form.

24. Apparatus for manufacturing multiple inductance coil units, comprising means for winding a piece of wire around an elongated coil form in such manner as to provide a plurality of inductance coils displaced along the axis of said coil form and conected by an intervening portion of said wire, said coil form having terminal members thereon which are provided with contact engaging surfaces projecting beyond one side of said coil form and wire receiving end portions projecting from another side of said coil form, said winding means being arranged to provide a winding pitch in the vicinity of predetermined ones of said terminals such that said wire lays in said wire receiving end portions and is positioned beside said contact engaging surfaces of said predetermined terminals as said coils are wound on said coil form, means operative after said coils have been wound on said coil form for soldering the ends of said coils to said wire receiving end portions of said terminals, and means operative after the solder has solidified for severing said intervening portion of said wire, thereby to provide electrically separate coils on said coil form.

25. Apparatus for manufacturing multiple inductance units of the type comprising a coil form having a plurality of terminals in spaced apart relationship thereon and a plurality of coils wound on said form and connected between predetermined ones of said terminals, said apparatus comprising support means for supporting said coil form, a wire feed mechanism for supplying wire to said coil form, drive means for producing relative rotation between said coil form and said wire feed mechanism, means for producing relative movement between said coil form and said wire feed mechanism in a direction generally parallel to the longitudinal axis of said coil form and simultaneously with said relative rotation, a source of molten solder, means operative after completion of the winding of said wire on said coil form for causing relative movement between said coil form and said solder source so that solder engages said terminals and the adjacent portions of the wire, means for causing relative movement between said coil form and said solder source to move said terminals out of engagement therewith, and wire removal means movable into engagement with selected portions of the wire wound on said coil form after the solder has solidified to remove undesired wire connections from said unit.

26. Apparatus for manufacturing multiple inductance units of the type comprising a solid elongated coil form having a plurality of conductive terminals spaced along the length of said coil form and a plurality of coils wound on said form and connected between predetermined ones of said terminals, said apparatus comprising means for winding a plurality of coils around said coil form with the end portions thereof in engagement with certain ones of said terminals, a source of molten solder, means operative after the completion of the winding of said coils on said coil form for causing relative movement between said coil form and said solder source so that solder therefrom is deposited on said terminals and the adjacent end portions of said coils, means for causing relative movement between said coil form and said solder source to move said terminals out of engagement therewith, and wire removal means operative after the solder has solidified and movable into engagement with said end portions at points adjacent said certain terminals to remove undesired wire connections from said unit.

27. Apparatus as set forth in claim 25, wherein said wire removal means includes a plurality of knives which are pressed into engagement with said selected wire portions.

28. Apparatus as set forth in claim 26, wherein said wire removal means includes a plurality of knives which are simultaneously pressed into engagement with said end portions.

29. Apparatus for manufacturing multiple inductance units of the type comprising a solid, elongated coil form having a plurality of conductive terminals extending transversely with respect to said coil form with wire receiving end portions projecting from one side of said coil form and a plurality of coils wound on said coil form and connected between predetermined ones of said terminals, said apparatus comprising means for winding a plurality of coils around said coil form with the end portions thereof positioned within said wire receiving end portions of certain ones of said terminals, a source of molten solder, means operative after completion of the winding of said coils on said coil form for causing relative movement between said coil form and said solder source so that solder therefrom is deposited on said terminals and the adjacent end portions of said coils, means for causing relative movement between said coil form and said solder source to move said terminals out of engagement therewith, and wire removal means operative after the solder has solidified and movable into engagement with said end portions at points adjacent said certain terminals to remove undesired wire connections from said unit.

30. Apparatus as set forth in claim 29 wherein said wire receiving end portions of said terminals are provided with notches the bottom edge of which is spaced from the adjacent surface of said coil form and said plurality of coils are wound around said coil form with the end portions thereof positioned within said notches and spaced from the adjacent surface of said coil form.

References Cited by the Examiner

UNITED STATES PATENTS

| | | | |
|---|---|---|---|
| 1,807,199 | 5/1931 | Dear | 140—92.2 |
| 1,910,687 | 5/1933 | Freeburg | 140—2 |
| 1,947,689 | 2/1934 | Young | 140—92.2 |
| 2,030,988 | 2/1936 | Hofstetter | 140—92.2 |
| 2,154,792 | 4/1939 | Weber | 140—92.2 |
| 2,371,780 | 3/1945 | Sirp | 140—71.5 |

(Other references on following page)

UNITED STATES PATENTS

| | | | |
|---|---|---|---|
| 2,486,450 | 11/1949 | Wahl | 140—71 |
| 2,559,824 | 7/1951 | Leland | 140—92.2 |
| 2,576,568 | 11/1951 | Burge et al. | 140—92.2 |
| 2,619,063 | 11/1952 | Anderson | 228—8 |
| 2,717,092 | 9/1955 | Gartner et al. | 140—71.5 |
| 2,780,246 | 2/1957 | Steger | 140—92.2 |
| 2,783,525 | 3/1957 | Scharf | 228—5 |
| 2,875,717 | 3/1959 | McWilliams | 228—8 |
| 2,959,367 | 11/1960 | Kuba et al. | 140—71.5 |
| 2,964,007 | 12/1960 | Buffington | 228—12 |
| 2,978,005 | 4/1961 | Park | 140—92.2 |
| 3,003,525 | 10/1961 | Fuller | 140—71 |
| 3,020,937 | 2/1962 | Fryklund | 140—71 |

CHARLES W. LANHAM, *Primary Examiner.*

W. H. JUST, *Assistant Examiner.*